(12) United States Patent
McKenzie

(10) Patent No.: US 6,612,433 B2
(45) Date of Patent: Sep. 2, 2003

(54) FOLD FORMED CD JACKET AND METHOD

(76) Inventor: Paul McKenzie, 411 Vernon Way, El Cajon, CA (US) 92020

(*) Notice: Subject to any disclaimer, the term of this patent is extended or adjusted under 35 U.S.C. 154(b) by 21 days.

(21) Appl. No.: 09/953,529

(22) Filed: Sep. 14, 2001

(65) Prior Publication Data

US 2003/0052021 A1 Mar. 20, 2003

(51) Int. Cl.⁷ .............................................. B65D 85/57
(52) U.S. Cl. ................................. 206/308.1; 206/312
(58) Field of Search ..................... 206/308.1, 310–313; 229/67.4, 75, 301, 303; 493/325, 356, 944, 959

(56) References Cited

U.S. PATENT DOCUMENTS

| | | | |
|---|---|---|---|
| 2,021,620 A | * | 11/1935 | Weir ........................... 229/75 |
| 4,203,521 A | | 5/1980 | Dunn |
| 4,694,954 A | | 9/1987 | Moss |
| 4,744,509 A | * | 5/1988 | Buchler-Dopheide ........ 229/75 |
| 5,004,144 A | | 4/1991 | Selga |
| 5,590,912 A | | 1/1997 | Stevens |
| 5,638,666 A | | 6/1997 | Davidov |
| 6,006,457 A | | 12/1999 | Transport |
| 6,016,908 A | * | 1/2000 | Gaetano .................. 206/308.1 |
| 6,117,061 A | | 9/2000 | Popat et al. |

* cited by examiner

Primary Examiner—Luan K. Bui
(74) Attorney, Agent, or Firm—Donn K. Harms (57) ABSTRACT

The device provides for the formation of a CD jacket using conventional or custom dimensioned paper by imparting a diagonal folding pattern to the paper to be used for the CD jacket. The folding pattern is imparted to the paper and a defined series of folding steps followed to yield the CD jacket. Reversing the last step in the folding sequence provides access to the internal pocket formed by folding the paper through an aperture in a top flap. Completing the last step in the sequence seals the internal pocket. The folding sequence may be imparted to the paper using printing or scoring or both to yield the diagonal lines on which folds are made.

24 Claims, 4 Drawing Sheets

FOLD FORMED CD JACKET AND METHOD

FIELD OF THE INVENTION

This invention relates to the storage of compact disks used in computers and audio and visual entertainment systems. More particularly it relates to improvement of the containment, personalization, transportation, computer enhancement and storage method used to retain a digital compact disk, known and related to further in this disclosure as CD's, through the placement of a target grid for folds on paper allowing individual assembling of personalized CD containers from single, uncut sheets of conventional or custom dimensioned paper.

BACKGROUND OF THE INVENTION

The digital compact disc, or CD, now commonplace in stereos and computers, was introduced in 1982 for digital and audio reproduction. Formally known as compact disc read-only memory, it is a form of a compact disc that reads by optical means. The CD-ROM drive uses a low-power laser beam to read digitized (binary) data that has been encoded in the form of tiny pits on an optical disc. The drive then feeds the data to the computer for processing. Co-invented by Philips Electronics N.V. and Sony Corporation in 1980, the compact disc has expanded beyond audio recordings into other storage-and-distribution uses, notably for computers (CD-ROM) and entertainment systems (videodisc). The compact disc comprises a thin polymeric circular member approximately 4¾ inches (12 centimeters) in diameter and having a central aperture to be received on the spindle or centering mechanism of a CD disc player. With the proliferation of growing multimedia files (i.e., audio, graphic, and video) in computer games, educational software, and electronic encyclopedias, as well as high definition movies and the ever expanding storage medium, digital videodiscs (DVD), introduced in 1995, the average computer users are acquiring a large number of CD's.

Shortly after the advent of the compact disc the conventional "jewel box" packaging container was adapted for sales and storage. These polymeric containers hinge on one side opening to access the internal compartment housing the CD disc, and are susceptible to cracking, and breakage of the hinges. Additionally, the over-all thickness of 0.3125 inch of the container, is far greater than necessary for the protection of the disc, making the storage of multiple discs unduly wasteful of space. There has been little or no change in the basic shape of the CD holder since its initial development. Other storing methods include modified envelopes, which may be purchased from an office supply, but have no method of personalization or computer enhancement such as printing upon them using a conventional printer.

U.S. Pat. No. 4,694,954 of Ira. Moss discloses an article of manufacture comprising a compact disc and convertible package thereof. The device comprises a blank, divided into four panel members by cruciform pairs of parallel intersecting fold lines. A flap portion is formed adjacent to a surface of at least one of said panels and the compact disc is received between the flap and panel. The device may be converted to the storage mode by removing the film, discarding the stiffener member, and folding the panels about the cruciform fold lines to provide a structure in which the disc is encompassed between four thicknesses of material. Tendencies of the device to buckle of expand when in the storage mode are minimized by removing the portion of the blank that encompasses the intersection of the hinge lines, and by connecting the flap to one of the panels in a tension condition. This is primarily a sales and promotional device, providing the durability required to protect the CD, with the limited capability of being modified for a storage container. It still remains a stiff polymer packaging device, with more than the necessary thickness required for storing compact discs and lacks the ability for computerized personalization.

U.S. Pat. No. 4,203,521 of Stanley A. Dunn teaches of a packet for containing documents and for providing thermal protection of those documents, the packet including a sacrificial ablating layer surrounding the documents, and a metal foil covering for shielding the ablating layer from contact with surrounding air. This is a packet for providing thermal protection for documents, with no indication of the light, thin storage of compact discs.

U.S. Pat. No. 5,004,144 of Betty J. Selga describes a reusable gift-wrapping comprised of a flexible expanse of folding fabric having releasable Velcro fasteners secured to its periphery. The Velcro fasteners are engaged when the fabric is folded to envelop a carton placed within the expanse of foldable fabric. This is clearly a process of gift wrapping not relating in any way to compact disc storage.

U.S. Pat. No. 6,117,061 of Ghanshyam H. Pompat et al, discloses a method for custom printing and forming three-dimensional structures using a computer and a computer-controlled printer, incorporating several steps. A flexible rectangular sheet is perforated to form a removable portion. Lines of weakness are formed on the removable portion, to serve as fold lines that ultimately fold the two-dimensional removable portion into a three-dimensional structure. A user instructs a computer program to command a computer-controlled printer to print particular information onto the printing surface of said removable portion. After printing, the user removes the removable portion from the sheet along the perforations and then folds the removable portion along the lines of weakness and secures the folded sheet into a three-dimensional structure. The computer program enables the user to design the custom printing for the structure, and optionally to preview the ultimate appearance of the three-dimensional structure. With this invention a computer is used to create a three-dimensional object to be cut or removed from a single sheet of paper, by the means of cutting on computer generated lines or pre-applied scoring or perforations in the paper. When paper is put through two separate devices as in a scoring or perforating device, and then into a computer by an amateur or a person unskilled in the act of publishing, there may be some alignment problems. Although this object is created from a single sheet of computer paper, there is an involved cutting or separating process along with attaching the parts, and it does not relate to the packaging or storing of computer compact discs.

U.S. Pat. No. 5,590,912 of Scott A. Stevens describes a product and method relating to a personalized envelope assembly secured to the interior of a printed publication such as a magazine, and more particularly to the means and method for binding in the envelope assembly to a personalized and/or customized publication and containing an information bearing disc. This patent primarily deals with the insertion of an envelope into a publication along with the binding methods, not relating in anyway to the personalized unique formation, storage and containment of compact discs constructed from a single sheet of uncut computer conventional or custom sized paper disclosed herein.

U.S. Pat. No. 5,638,666 of Gil Davidov discloses an invention directed to an apparatus and method for making an envelope from ordinary size, readily available, writing paper. Preferably, the apparatus is a compact desktop size machine that can be combined with any common office printer, such as a laser printer, or even incorporated therein, to form a single machine. This patent describes a machine for making a mailing envelope from a single sheet of paper, not conveniently adapted to the unique shape of a computer disc, where the disclosed invention requires the unique use of diagonal folds to adequately enclose the compact disc.

U.S. Pat. No. 6,006,457 of Felix Transport teaches of collapsible three-dimensional hollow ornamental structures. A polyhedral shaped, collapsible hollow structure having a fully enclosed hollow interior that is made from a blank cut from a single sheet of folding board or like sheet material, the blank having a dual cruciform configuration and being provided with a plurality of longitudinal, transverse and oblique scores to enable it to be folded and glued. This patent describes another folded ornamental device made from a single sheet of folding board or like material of no specific size, which requires cutting out or removing by using the perforation process. This patent bears no similarity described herein to the folded jacket, that may be used for the storage or mailing of compact discs.

Consequently there exist a growing need for a CD storage device that can easily and individually be formed from simple conventional paper. Such a device should use a simple method for constructing individual CD jackets to provide containers for the ever growing number of compact discs that are used in the field of audio, graphic, and video software. In forming such a CD jacket from conventional paper, the method and apparatus should provide easy user configuration and assembly of jacket that is easily customizable for labeling of the contents, and providing secure storage from damage for the computer disk therein contained.

SUMMARY OF THE INVENTION

The above-noted problems and others are overcome by the unique CD Jacket device, and the method for its forming from but not limited to a single sheet of uncut, standard size paper. Using a computer program or pre printing, fold lines identifying information and ornamentation for the contained disk, will be printed on the paper used for forming the jacket. Printing on both sides of the paper may require printing on one side then turning the paper over and re-inserting the paper back into the printer and printing again on the reverse side. The use of conventionally sized paper is allowed through the use of a novel folding pattern using target fold lines formed with diagonal printing or placement which designate the precise pattern for the diagonal fold lines used to form the appropriate sized CD jacket. Placement of the fold lines on the chosen piece of paper will be accomplished in one preferred embodiment through a special computer program devised for this purpose. The paper may be the common white paper used in computer printers or optionally a custom paper with a glossy color, or just colored surface on one or both sides thereby producing user customizable and professional look.

For optionally enhanced embodiments of the jacket device, custom paper could be provided to the user for imprinting on the computer printer which has adhesive activated by moisture or pressure on the inner surface of the top flap, or on inner surfaces of both top and bottom flap or the inner surface of just the bottom flap of the CD Jacket. Pre-printed and pre-scored papers can be made available in a packaged unit for those without a computer but desirous of using the CD Jacket for audio or video purposes and the ability to label it. The most common adhesive means would be placing a strip of commercially available double sticky back adhesive tape, one half inch from the edge, along the bottom flap, so that the top flap will tuck beneath the bottom flap. With a specialty paper pack for the CD Jacket, double sticky tape can be supplied however conventional transparent tape would work. Different weights or thickness of paper may also be used for the CD Jacket. The paper will be folded along the diagonal lines that are printed on the paper surfaces.

An additional embodiment would define the necessary diagonal fold lines by scoring the sheet of paper with one of the scoring methods disclosed or using pre-scored paper. Scoring while not necessary to define the diagonal fold lines, allows simplification and accuracy of the folding process.

While one preferred embodiment of this invention will use the conventional 8½×11 inch paper widely available and used on most computer printers, other optional sizes of paper, like A4 or a specially cut size, while not as convenient, will work and should be considered to be covered within the scope of this patent. Additional benefits are gained by using a paper sized to yield an even better dimensioned final envelope by using a paper substantially 8.5 inches by substantially 11.769 inches.

The unique feature of this patent when used to encompass a conventionally sized CD, is by the provision of a target means for the specific fold lines to yield the diagonal folding of the paper along two primary substantially parallel diagonal lines substantially 4⅞ inches apart. Then the paper is folded along two secondary substantially parallel lines 4⅞ inches apart, substantially normal to the first two lines thereby yielding a square enclosure for the intended CD. All folding will be done inwardly forming the enclosure area, with fold lines printed scored or otherwise properly positioned on this surface, designated as the second surface of the paper.

The enclosure area of the CD Jacket provided by the designated target fold lines, provides an area adequately large enough to retain one compact disc and the literature commonly enclosed within the commercial packaging. The outside of the CD Jacket may be printed with information and/or ornamentation The device to yield a CD jacket using conventionally sized paper uses an initial fold being made inwardly and diagonally from the upper left hand corner of the paper to the right hand side of the page along the computer generated or preprinted, transferral fold line, forming the hypotenuse of a right triangle, thus creating the first primary fold. The second primary fold is made inwardly, and substantially parallel to the first primary fold, 4⅞ inches apart, translating diagonally across the paper along the hypotenuse of a second right triangle, at or immediately adjacent to the corner of the paper, and also along a transverse fold line. With the 90° corner of the first right triangle folded over along the first primary transverse fold line, inwardly and flat against the paper surface and the 90° corner of the second right triangle folded over along the second primary fold line, flat against the paper surface, the paper will take the form of a parallelogram with the lower corner missing. In the parallelogram state the first surface of the paper forming the outside of the CD Jacket has the secondary perpendicular fold lines printed on it so that the bottom flap and top flap can fold in place. The top and bottom flaps are in the shape of quadrilaterals with acute and obtuse angles on one side, and 90° angles on the folding edge. The bottom flap can be adhered in place by means of double-back sticky tape, or pre-applied adhesive on specialty paper along the diagonal edge. The adhesive is best distanced from the edge, currently substantially ½ inch back from the edge, allowing the top flap to be inserted under the edge. On the acute end of the bottom flap, the angle falls short, forming a natural tab, to aid in the insertion of the top flap beneath the edge of the bottom flap.

With this unique design the CD Jacket formed from standard 8½ by 11 paper has a desired diagonal opening flap providing an insertion aperture communicating with the pocket formed inside the folds that when in the open state creates a channel by which the compact disc rolls into the enclosure or pocket. The opening flap can then be folded over to maintain the CD inside the pocket.

Optionally, paper can be provided with scoring of the diagonal target folds formed along the transverse fold lines which will make the folding process easier, but is not necessary in creating the CD Jacket. Or, the paper may be custom sized to yield the best current embodiment of the device by using paper substantially 8.5 inches by substantially 11.769 inches which thereby yields a CD jacket with the especially easy to use openings and flaps.

Although diagonal folding along the printed lines is the simplest preferred embodiment to provide target folds that will yield a CD jacket, a number of alternate means to produce the desired diagonal target folds may be incorporated into the assembly process that will make the folding process easier. The first being a folding platen with the transverse fold lines relieved on one side and projecting on the other so that when the paper is inserted and the platen is closed, the paper will be adequately deformed along the diagonal target fold lines. The second method of placing target lines for folding on the paper would use scoring and would entail a plastic template. The templet would have elongated slots communicating therethrough in positions to scribe the paper in the proper position for the target folds whereby the user would use a tool to scribe the lines along the edges of the template. The third method of providing the lines properly positioned for diagonal folding scoring would incorporate an embossed sheet of plastic with protrusions along the transverse fold lines so that when the plastic sheet was placed over the paper and the surface is rolled over with a small roller, the impressions are inscribed into the paper making the desired scoring application.

It is an object of this invention is to create a personalized paper enclosure for a compact disc, which can be folded to size by an individual using computer placement of target diagonal fold lines printed on conventional sized paper.

Another object of this invention is to create an enclosure for a compact disc that requires no cutting to fabricate and requires only folding along printed diagonal fold lines to assemble.

A further object of the invention is to create a CD Jacket that can be further enhanced and customize through computer generated graphics and text which may be printed on both sides of the completed enclosure.

Another object of this invention is to create a CD Jacket easily formed from specialty papers, colored, glossy, pre-scored or with adhesive applied for a sealing means.

An additional object of this invention is to create a CD Jacket from a single sheet of paper that can be glossy, colored and individualized on one side, and when folded the enhancement will be displayed on both sides of the completed CD Jacket.

Still another object of this invention is to create a storage envelope for a CD that is approximately one fifth the thickness of the current plastic cases used for sales and storage thereby reducing the required area for the ever increasing number of compact discs used by individuals in their audio, graphic, and video applications.

And yet another object of this invention is to provide a method and apparatus for scoring the paper to yield the diagonal parallel fold lines either before or after printing, to simplify the folding process forming the resulting CD jacket.

These together with other objects and advantages which will become subsequently apparent reside in the details of the construction and operation as more fully hereinafter described and claimed, reference being had to the accompanying drawings forming a part hereof, wherein like numerals refer to like parts throughout.

DETAILED DESCRIPTION OF THE PREFERRED EMBODIMENTS

Figure 1:
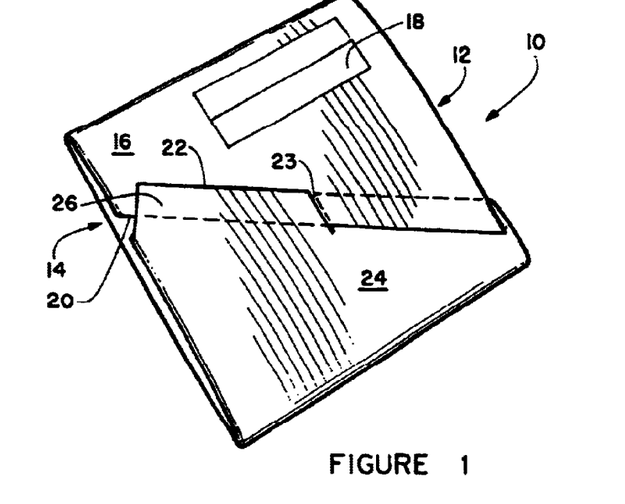
FIG. 1 depicts a perspective view of the CD Jacket in the folded state, with the top flap tucked under the lip of the bottom flap exposing only the first surface of the paper.

Referring now to FIG. 1, showing the fully assembled device 10 showing the front side 12 of the device 10 which forms a CD jacket in the assembled configuration with back surface 14. FIG. 1 also displays the top flap 16 generally quadrahedral in shape with the indicia 18 forming a labeling designation area, folding instructions, or pattern, and with bottom edge 20, of the top flap 16 tucked under top edge 22 of the bottom flap 24 generally quadrilateral in shape and extending through notch 23 which provides an engagement between the top flap 16 and bottom flap 24 thereby holding them in place. The corner tab 26 is formed where the tip or acute angle of the quadrilateral falls short. This corner tab 26 enables the bottom edge 20 to slip beneath top edge 22 easily, without catching on an extended acute angle.

Figures 2, 3:
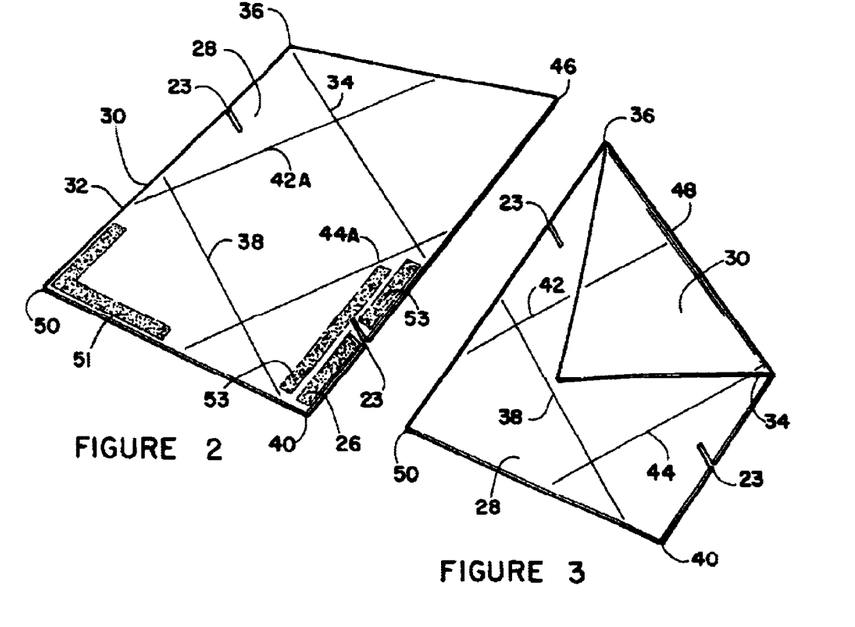
FIG. 2 depicts a perspective view of a flat sheet of printer paper with transverse diagonal fold lines printed on the inside or second surface of the paper. The paper can be conventional 8.5 inch by 11 inch paper or in the best performing embodiment yielding the best dimensioned jacket, paper substantially 8.5 inch by substantially 11.769 inch would have the fold lines thereon.
FIG. 3 depicts a perspective view of the sheet of paper with the 90° corner of the first right triangle folded over along the first, primary fold line.
Figure 2A:
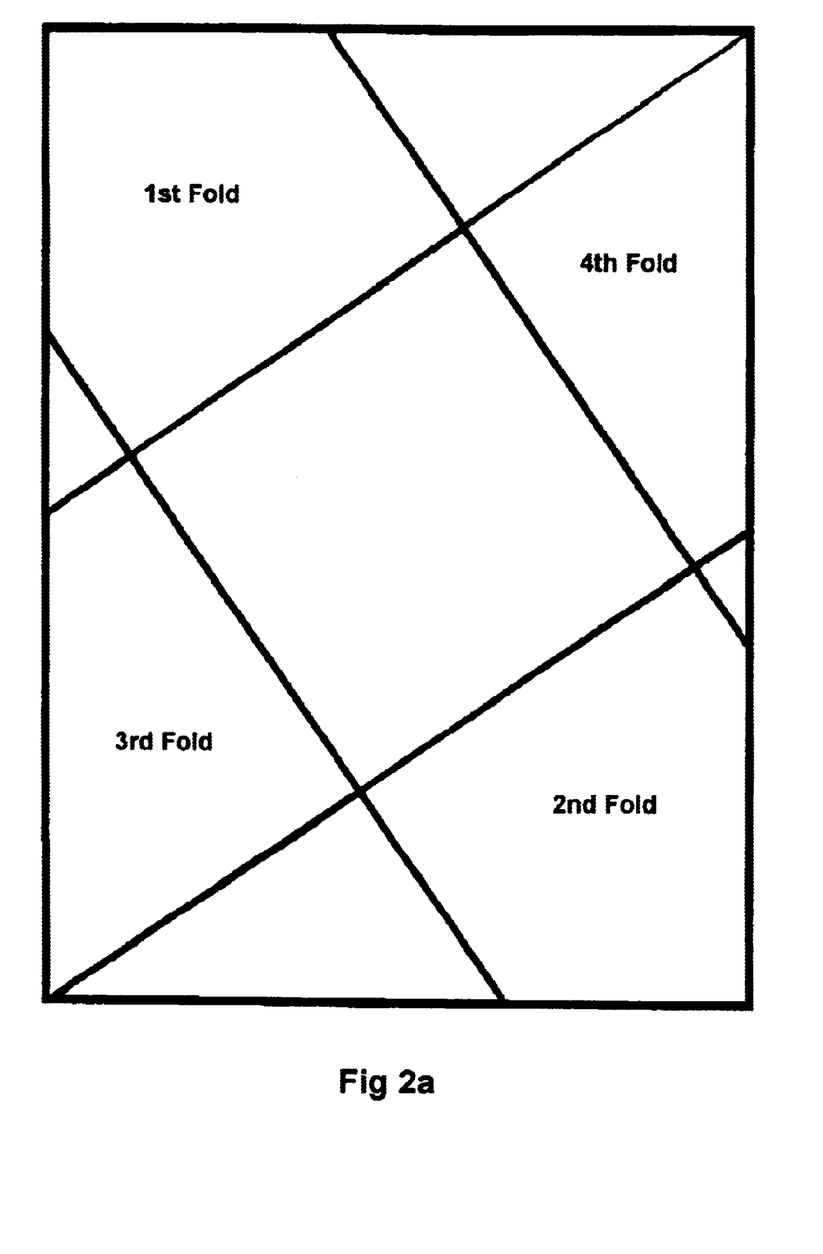
FIG. 2A depicts a top view of the flat sheet of paper shown the fold lines and indicia indicating folding steps.

FIG. 2 depicts a pre-printed perspective view of a sheet of paper 32, with the second surface 28 in the up position, and the first surface 30 down. The sheet of paper may be 21 conventional 8.5 inch by 11.5 inch paper or in an especially preferred embodiment of the device 10 as depicted in FIG. 2a, the sheet of paper 32 would be substantially 8.5 inches by substantially 11.769 inches. A folding pattern is placed on the second surface 28 or if desired the first surface 30 having primary and secondary fold lines positioned as targets for the folding necessary to yield the device 10. The first primary fold line 34 translates diagonally from the upper corner 36 of the sheet of paper 32. Of course the use of upper and lower and locational terms are used for illustrative purposes as those skilled in the art will realize that the lines and patters may be mirrored or otherwise imparted to the sheet of paper 30 to yield the device 10. The second primary fold line 38 translates substantially parallel, diagonally across the sheet of paper 32, substantially 4⅞ inches from the first primary fold line 34 when making a jacket for a conventionally sized CD. It should be noted that using diagonal lines allows the second primary fold line 38 to fall short of the lower corner 40 of the sheet of paper 32 thereby creating the desired corner tab 26 when 16 assembled. As is obvious to those skilled in the art the folding pattern may be mirrored on the sheet of paper 32 and yield the same jacket when folded. When using a sheet of paper 32 custom sized to substantivally 8.5 inches by 11.769 inches the fold line 38 extends exactly the bottom left lower corner 50 as depicted in FIG. 2a thereby yielding the current preferred embodiment of the device 10 when folded.

A first secondary fold line 42A translates diagonally across the sheet of paper 32, substantially normal or 90° to the first and second primary fold lines 34 and 38. The second secondary fold line 44A translates substantially parallel to the first secondary fold line 42A and diagonally across the sheet of paper 32, substantially 4⅞ inches from the first secondary fold line when the folding pattern formed is for a conventionally sized CD.

Figure 4:
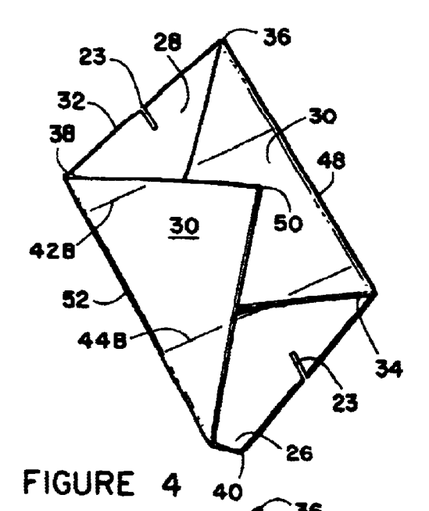
FIG. 4 depicts a perspective view of the sheet of paper with the 90° corner of the second right triangle folded over along the second primary fold line and the paper in the shape of a parallelogram with the lower corner off, revealing the fold lines printed on the other side or first surface of the paper.

To initiate the four step folding sequence 33 which can be explained in directions distributed with the device 10 or printed on the device 10 as shown in FIG. 2A or as letters in sequence A, B, C, D, displayed in FIG. 2A and shown in folds of FIGS. 3–6. The folding sequence 33 proceeds first as the top right corner 46 is folded across the sheet of paper 32 creasing along the primary fold line 34 placed as a target and creating the folded edge 48. FIG. 4 depicts a perspective view of the parallelogram shape created when bottom left lower corner 50 is folded over along the second primary fold line 38 and creased to form the left folded edge 52. Optional means of attachment such as the aforementioned adhesives such as adhesive tape 51 may be placed to hold the lower corner 50 in operative engagement when folded. Notably shown in this view is that the first surface 30 of the sheet of paper 32 covers most of the second surface 28. Because of this, in preferred embodiment providing better viewing of the secondary fold lines 42A and 42B during folding of the device 10 the secondary fold lines 42A and 44A can be printed on the first surface 30 of the sheet paper 32, creating the secondary fold lines 42B and 44B. However the device 10 will function with both secondary fold lines 42B and 44B just placed on the second surface 28 with a little more attention paid to the line positions.

Figure 5:
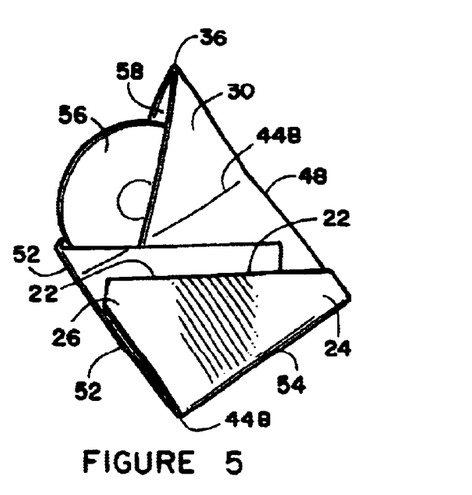
FIG. 5 depicts a perspective view of the CD Jacket with the bottom flap folded along the first, secondary fold line, and a CD partially inserted in the channel entry of the enclosure.

FIG. 5 depicts a perspective view of the device 10 formed after the first three steps in the folding sequence yielding an open CD Jacket with the bottom flap 24 folded up along the second secondary fold line 44B forming the bottom folded edge 54. Compact disc 56 is displayed being inserted into aperture 58 which communicates with the storage pocket 59 formed between the folded flaps allowing a means for the CD to be inserted easily and slide into the storage pocket 59 or removed therefrom after the fourth fold in the sequence is completed by reversing the last fold and thereby providing access to the aperture 58 communicating with the storage pocket 59.

Figures 6, 7, 8:
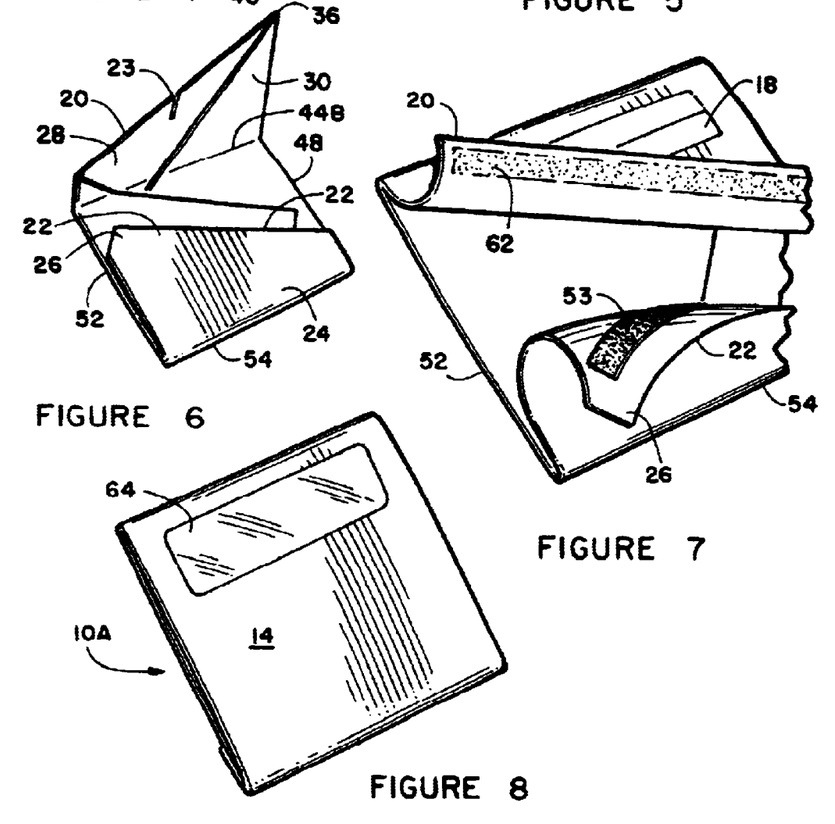
FIG. 6 depicts a perspective view of the CD Jacket with the top flap partially folded along the second, secondary fold line.
FIG. 7 depicts a perspective view of the under sides of the bottom flap showing the location of the optional adhesive strips.
FIG. 8 depicts a perspective view of an optional window available on specialty paper.

FIG. 6 displays the device 10 pictured as a CD jacket with the top flap 16 partially folded along the secondary fold line 44B. In the unique folding sequence of yielding the device 10 in the form of a CD jacket, the second surface 28 of the sheet of paper 32 is completely enclosed, exposing only the first surface 30 of the paper 30. This surface may be printed upon by the user using indicia identifying the CD enclosed in the storage pocket 59 and any desired ornamentation.

While not necessary to function as a CD jacket, additional utility is yielded by a means of holding the top flap 16 to the bottom flap 24 to thereby securely hold the CD in the storage pocket 59 with the aperture 58 closed. Several common means of attachment the top flap 16 and bottom flap 24 into position may be incorporated as depicted in FIG. 7. Most common, but not limited to, the use of adhesive means such as double sticky back tape 53 placed substantially ½ inch from, and parallel to the top edge 22 of the bottom flap 24. Or optionally pre-applied, moisture activated adhesive 62 applied to special paper for the device 10 will be available. Or, the double sticky back tape 53 can be placed only on the inside of the bottom flap 24 to secure the bottom flap to the folded over first surface 30 and thereby providing an overlapping edge 63 at top edge 22 under which the top flap 16 may be removably secured. As is obvious to those skilled in the art, an adhesive means suitable to the purpose of permanent or temporary and removable attachment would be chosen.

FIG. 8 displays an alternate embodiment of the device 10 as a CD jacket with a cellophane window 64 allowing visual communication through back surface 14 displaying the literature or indicia about the enclosed compact disc thereby being self labeling.

Figures 9, 10, 11:
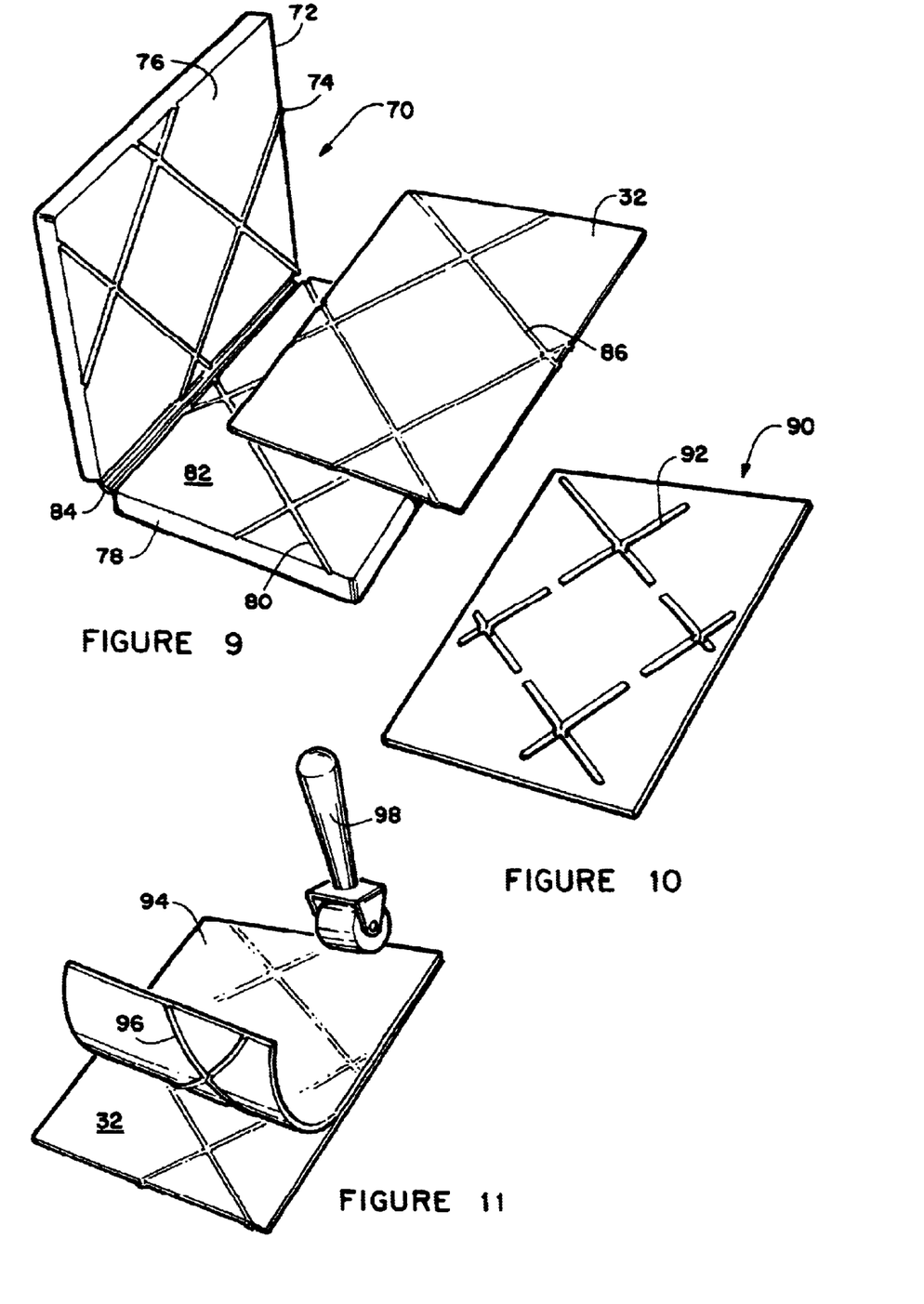
FIG. 9 depicts a perspective view of a platen with the transverse diagonal folding lines relieved in the base and projecting on the lid with a piece of scored paper.
FIG. 10 depicts a perspective view of a plastic template with cut-outs to guide a tool for scoring the paper.
FIG. 11 depicts a perspective view of a sheet of paper with a plastic sheet with the transverse fold lines protruding against the paper and a small roller pressing them in for the scoring operation. However a conventionally used printing scoring dye may also be used.

FIGS. 9, 10 and 11 display perspective views of different means to impart the folding pattern to the sheet of paper 32 other than by the aforementioned printing of the folding pattern. In this embodiment the folding pattern is scored into the sheet of paper 32 and could be used instead of the aforementioned printed folding pattern, or in addition to the printed folding pattern to yield an both visual and tactile aids to the precise diagonal pattern required to yield the device 10.

In this embodiment, a mechanical means to score the paper along the folding pattern would be provided. The first is a platen 70 that has top plate 72 with raised lines 74 projecting off the surface 76, and a bottom plate 78 with matching grooves 80, in surface 82. When these two plates are folded together by means of hinge 84, with a computer style sheet of paper 32 inserted, depressions 86 are inscribed in the sheet of paper 32 generally along the folding pattern, making the folding sequence easier. The second method would make use of a rectangular plastic template 90, with slots 92 communicating therethrough that a creasing tool (not shown) can be inserted into to impart scores along the diagonal lines forming the folding pattern on the sheet of paper 32. Should the printer on the computer which prints the lines on the paper fail, this templet 90 would also allow a pencil to be used to draw the folding pattern on the sheet of paper 32.

Another embodiment of a device for scoring the paper that can be provided to provide a mechanical means of scoring the paper along the lines of the folding pattern would be an embossed sheet 94 of plastic or other hard material, with protrusions 96 rising from the surface and in positions to register with the desired fold lines of the folding pattern noted above. When the sheet of paper 32 is placed on a surface under the sheet 94 and a small roller 98 is rolled over the, impressions are transferred into the sheet of paper 32, scoring the sheet of paper 32 in positions to correspond to the folding lines of the folding pattern.

The device 10 could thus be formed by printing the folding pattern on the sheet of paper 32 as depicted in FIGS. 2 and three and then folding the sheet of paper 32 to yield the device 10 in CD jacket form. Or the device could be formed using the scoring apparatus depicted in FIGS. 9–11 to score the paper along the fold lines of the folding pattern. Or, the device could be formed using both the printing and scoring to aid in the proper folding along the folding patter needed to yield the proper sized CD jacket. If provided in a kit form with both a mechanical means for scoring the paper with the desired folding pattern and software to print the fold pattern, the user could choose one or both means of imparting the folding pattern of diagonal lines to the paper as desired.

While the present invention has been described herein with reference to particular embodiments thereof, a latitude of modification, various changes and substitutions are intended in the foregoing disclosure, and it will be appreciated that in some instance some features of the invention will be employed without a corresponding use of other features without departing from the scope of the invention as set forth.

What is claimed is:

1. A Compact Disc jacket formed by folding a piece of paper without the need to die cut the paper, comprising:
    a flat rectangular sheet of paper having a straight top edge, a straight bottom edge, a straight first side edge and a straight second side edge;
    a first surface area defined by the area between said top edge, said bottom edge, said first side edge and said second side edge;
    a second surface area opposite said first surface area;
    means to impart a folding pattern of diagonal lines to said first surface area, said folding pattern having first diagonal line, a second diagonal line, a third diagonal line and a fourth diagonal line;
    said first diagonal line extending substantially from said first side edge to said bottom edge;
    said second diagonal line being substantially parallel to said first diagonal line and extending substantially from said top edge to said second side edge;
    said third diagonal line extending substantially from said first side edge to said top edge, said third diagonal line substantially normal to both said first and said second diagonal lines;
    said fourth diagonal line extending from a starting point adjacent from a corner formed by the intersection of said first side edge and said bottom edge, to substantially said second side edge, said fourth diagonal line substantially parallel to said third diagonal line;
    a central rectangle substantially square in shape, formed on said first surface by the area between said first diagonal line, said second diagonal line, said third diagonal line, and said fourth diagonal line;
    providing a sequence of steps for folding said paper along (said diagonal lines toward said central rectangle thereby forming two overlapping side flaps which form two parallel closed side edges a top flap and a bottom flap;
    said sequence of steps when complete yielding a substantially square jacket dimensioned to accommodate the intended compact disc;
    said jacket having a substantially square pocket area substantially the size of said central rectangle;
    said pocket area accessible through an aperture formed in said top flap when the last of said sequence of steps is reversed to an open position; and
    said pocket area covering substantially all of said central rectangle when said top flap is in said open position;
    said aperture sealable when said last of said sequence of steps for folding is completed, whereby a sealed jacket having a pocket therein for a compact disk is formed by completing said sequence of steps of folding said paper along said folding pattern, and said pocket is accessible by reversing the last of said steps allowing access to said pocket.

2. The Compact Disc jacket as defined in claim 1 wherein said paper is conventional 8½ by 11 sized paper.

3. The Compact disc jacket as defined in claim 1 wherein said means to impart a folding pattern of diagonal lines to said first surface area of said paper is a software program loadable into the operating memory of a computer communicating with a printer, said folding pattern being printed on said paper by said printer when instructed to do so by said computer program, whereby the user of said computer may print said folding pattern on said paper as desired by operating said software.

4. The Compact disc jacket as defined in claim 1 wherein said means to impart a folding pattern of diagonal lines to said first surface area of said paper is a means for scoring said paper to form impressions in said paper said impressions forming said folding pattern.

5. The Compact disc jacket as defined in claim 3 additionally comprising a means for scoring said paper to form impressions in said paper, said impressions formed along folding pattern.

6. The Compact disc jacket as defined in claim 3 additionally comprising:
    means of releasable attachment of said bottom flap to said top flap.

7. The Compact disc jacket as defined in claim 4 additionally comprising:
    means of releasable attachment of said bottom flap to said top flap.

8. The Compact disc jacket as defined in claim 5 additionally comprising:
    means of releasable attachment of said bottom flap to said top flap.

9. The Compact disc jacket as defined in claim 6 wherein said means of releasable attachment of said bottom flap to said top flap comprises:

adhesive placed on said bottom flap in position to affix said bottom flap to a least one of two overlapping side flaps;

a gap between said adhesive and an upper edge of said bottom flap, said gap forming a paper flap; and said top flap securable under said paper flap when said bottom flap is affixed to at least one of said two overlapping side flaps.

10. The Compact disc jacket as defined in claim 6 wherein said a means for scoring said paper to form impressions in said paper comprises:

a platen;

said platen having a top plate, said top plate having raised lines formed thereon;

said raised lines formed in said folding pattern;

a bottom plate, said bottom plate having groves formed therein corresponding to the positions of said raised lines of said top plate; and means to hinge one side of said top plate to one side of said bottom plate, whereby said paper when inserted between said top plate and said bottom plate will become impressed with said folding pattern when said top plate is closed against said bottom plate.

11. The Compact disc jacket as defined in claim 3 wherein said a means for scoring said paper to form impressions in said paper comprises:

a rectangular sheet of material forming a templet;

said templet having a plurality of grooves communicating therethrough;

said grooves positioned and shaped to impress said folding pattern in said paper when said paper is sandwiched between a flat surface and one side of said templet, and a creasing tool, said creasing tool forming said folding pattern in said paper when pulled through said grooves while concurrently forced into said paper.

12. The Compact disc jacket as defined in claim 4 wherein said a means for scoring said paper to form impressions in said paper comprises:

a rectangular sheet of material;

said rectangular sheet having a top surface having a plurality of ridges formed thereon;

said ridges formed in the shape of said folding pattern;

a roller; and said paper positionabie on said top surface whereby impressions are formed in the shape of said folding pattern when said roller is compressibly rolled over said paper positioned on said top surface.

13. The Compact disc jacket as defined in claim 1 additionally comprising:

an aperture formed in said second surface area, said aperture having transparent material therein; and said aperture providing viewing of a CD placed in said pocket through said transparent material.

14. The Compact disc jacket as defined in claim 1 additionally comprising:

a corner tab formed in said bottom flap; and said corner tab diagonal to one of said side edges thereby providing for easy insertion of a finger thereunder to lift said bottom flap.

15. The Compact disc jacket as defined in claim 1 additionally comprising:

said flat sheet of paper being substantially 8.5 inches by substantially 11.769 inches.

16. The Compact disc jacket as defined in claim 14 additionally comprising:

said flat sheet of paper being 8½ inches by 11 inches.

17. The Compact disc jacket as defined in claim 14 additionally comprising:

said flat sheet of paper being substantially 8.5 inches by substantially 11.769 inches.

18. The Compact disc jacket as defined in claim 1 additionally comprising:

a window aperture placed in said flat sheet of paper, said window aperture positioned to register with a portion of a compact disk inserted into said disc jacket.

19. The Compact disc jacket as defined in claim 18 additionally comprising:

a window aperture placed in said flat sheet of paper, said window aperture positioned to register with a portion of a compact disk inserted into said disc jacket.

20. The Compact disc jacket as defined in claim 1 additionally comprising:

means of releasable attachment of said top flap to said bottom flap.

21. The Compact disc jacket as defined in claim 20, wherein said means of releasable attachment of said top flap to said bottom flap comprises:

a notch formed in one of said top flap or said bottom flap, said notch providing means of releasable engagement of said top flap with said bottom flap to maintain said compact disc jacket in a closed position.

22. The Compact disc jacket as defined in claim 6 wherein said means of releasable attachment of said bottom flap to said top flap comprises:

said folding pattern imparted to said first surface area of said paper includes a designated notch for forming in one of said top flap or said bottom flap, said notch providing said means of releasable engagement of said top flap with said bottom flap to maintain said compact disc jacket in a closed position.

23. A method of forming a Compact Disc jacket by diagonally folding a piece of paper comprising:

taking a flat sheet of paper having a straight top edge, a straight bottom edge, a straight first side edge and a straight second side edge, a first surface area defined by the area between said top edge, said bottom edge, said first side edge and said second side edge, and having a second surface area opposite said first surface area;

imparting a folding pattern of diagonal lines to said first surface area, said folding pattern having first diagonal line extending substantially from said first side edge to said bottom edge and having a second diagonal line being substantially parallel to said first diagonal line and extending substantially from said top edge to said second side edge, and having a third diagonal line substantially normal to both said first and said second diagonal lines extending substantially from said first side edge to said top edge, and having a fourth diagonal substantially parallel to said third diagonal line extending substantially from said first side edge to said top edge, and having a square central rectangle formed on said first surface by the area between said first diagonal line, said second diagonal line, said third diagonal line, and said fourth diagonal line;

following a provided sequence of steps for folding said paper along said diagonal lines toward said central rectangle thereby forming to overlapping side flaps which form two parallel closed side edges, a top flap and a bottom flap;

completion of said folding sequence forming a pocket area accessible through an aperture formed in said top flap;

said pocket being square and substantially the size of said central rectangle whereby a sealed jacket having a pocket therein for a compact disk is formed by completing said sequence of steps of folding said paper along said folding pattern, and said pocket is accessible to an open position by reversing the last of said steps allowing access to said pocket through an aperture while said pocket still covers substantially all of said central rectangle to protect its contents when said pocket is in said open position.

24. The Compact disc jacket as defined in claim 23, additionally comprising the step of:

cutting a notch in one of said top flap or said bottom flap, said notch thereafter providing means of releasable engagement of said top flap with said bottom flap to maintain said compact disc jacket in a closed position.

\* \* \* \* \*